United States Patent [19]

Futagi et al.

[11] Patent Number: 4,471,438
[45] Date of Patent: Sep. 11, 1984

[54] LOCK-UP TYPE AUTOMATIC TRANSMISSION

[75] Inventors: Masaaki Futagi, Yokosuka; Masaaki Suga, Yokohama; Hideo Hamada, Yokosuka; Tadashi Suzuki, Yokosuka; Yoshiro Morimoto, Yokosuka, all of Japan

[73] Assignee: Nissan Motor Company, Limited, Yokohama, Japan

[21] Appl. No.: 266,958

[22] Filed: May 22, 1981

[30] Foreign Application Priority Data

May 26, 1980 [JP] Japan .................. 55-68948

[51] Int. Cl.³ .............. G06F 15/20; B60K 41/02; B60K 41/22; F16D 25/12
[52] U.S. Cl. ................ 364/424.1; 74/866; 192/3.28; 192/3.31
[58] Field of Search ........ 364/424.1, 431.03; 74/731, 732, 752 D, 866; 192/3.28, 3.29, 3.30, 3.31

[56] References Cited
U.S. PATENT DOCUMENTS

| | | | |
|---|---|---|---|
| 3,904,856 | 9/1975 | Monpetit | 364/431.03 |
| 4,056,177 | 11/1977 | Ahlen et al. | 192/3.30 |
| 4,155,277 | 5/1979 | Minami et al. | 74/866 |
| 4,208,929 | 6/1980 | Heino et al. | 74/731 |
| 4,263,822 | 4/1981 | Harmon | 74/733 X |

Primary Examiner—Felix D. Gruber
Attorney, Agent, or Firm—Schwartz, Jeffery, Schwaab, Mack, Blumenthal & Koch

[57] ABSTRACT

A lock-up control system for a lock-up type automatic transmission.

A load detection circuit generates a reference acceleration signal that indicates a reference acceleration, and an actual acceleration signal that indicates an actual acceleration of an automotive vehicle. The circuit compares the actual acceleration signal with the reference acceleration signal for generating a first command signal when the actual acceleration signal is greater than the reference acceleration signal and generating a second command signal when the actual acceleration signal is smaller than the reference acceleration signal. The first command signal is fed to a first vehicle speed comparator means to render it operative. The second command signal is fed to a second vehicle comparator means to render same operative. Each of the first and second comparator means compares the vehicle speed signal with a set of reference vehicle speeds for generating a plurality of patterns of signals that indicate a corresponding plurality of lock-up ranges.

9 Claims, 12 Drawing Figures

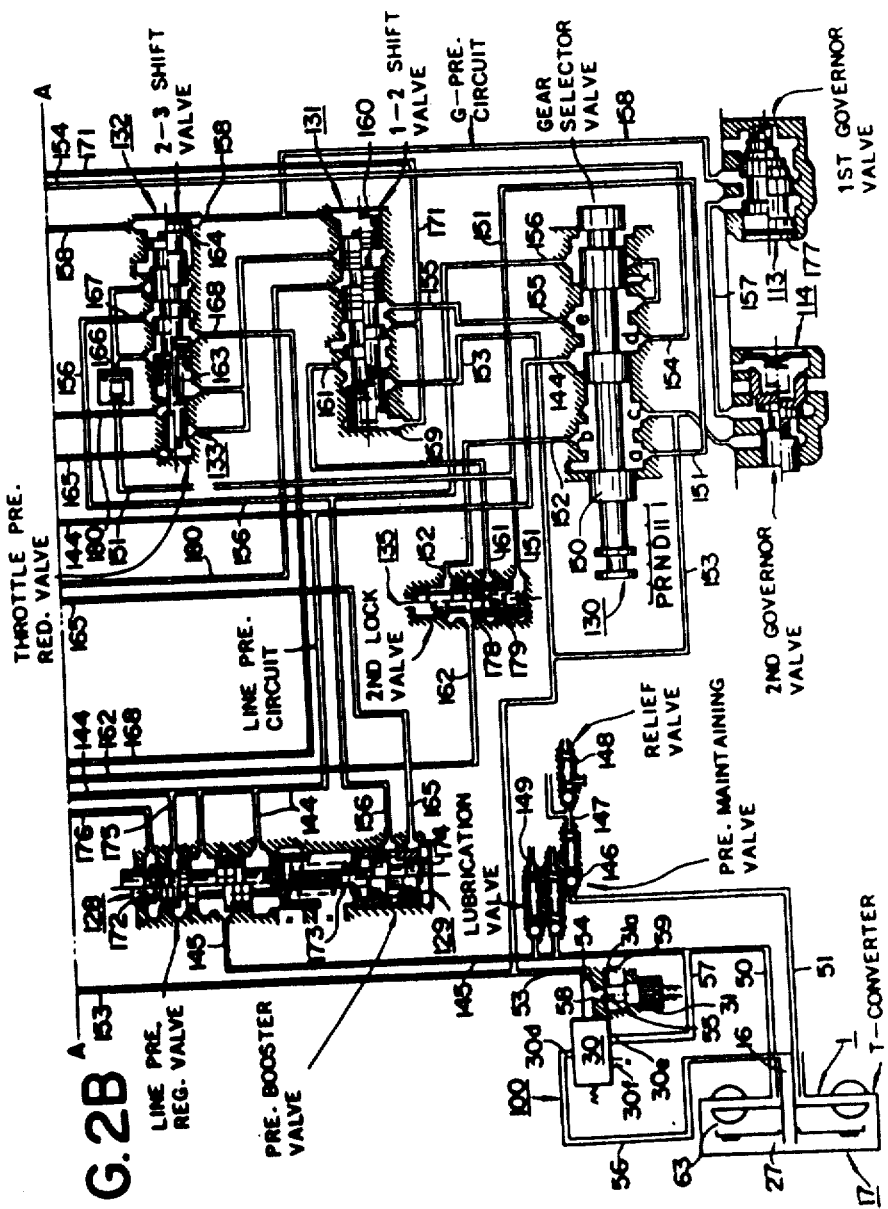

LOCK-UP TYPE AUTOMATIC TRANSMISSION

BACKGROUND OF THE INVENTION

1. Field of the Invention

The present invention relates to a lock-up control system for a lock-up type automatic transmission for an automotive vehicle.

2. Description of the Prior Art

Most automatic transmissions include a torque converter in a power transmission system thereof so as to increase the torque fed thereto from an engine. The common torque converters are of the type wherein a pump impeller driven by an engine rotates an operating oil within the torque converter so as to cause the rotation of a turbine runner under the reaction of a stator thereby to increase the torque (torque-converter mode). Accordingly, during the operation of the torque converter, a slip between the pump impeller and turbine runner is unavoidable. Thus, while the automatic transmission including such a torque converter in its power transmission system has an advantage in that it is easy to operate, but it also has a drawback in that the power transmission effeciency is poor and thus the fuel economy is accordingly poor. To alleviate this drawback, there has been proposed a torque converter with a direct clutch (a lock-up torque converter) wherein during relatively high vehicle speed operation, when the torque variation of an engine does not create a problem, the turbine runner is directly connected to the pump impeller (lock-up mode) thereby to eliminate slip therebetween. Some vehicles use a lock-up type automatic transmission including a torque converter of this kind.

In the conventional lock-up type automatic transmissions whenever a vehicle speed exceeds a reference vehicle speed (a lock-up vehicle speed) during operation of the vehicle in a predetermined gear ratio, a direct clutch of a torque converter is actuated to provide a lock-up state, and it is the conventional practice to set the reference vehicle speed at a fixed constant value for the gear ratio, above which a fixed constant value of torque variation of the engine does not create a problem. However, the reference vehicle speed above which the torque vibration is not regarded as a problem differs depending on a running load, such as an inclining surface of a road. The reference vehicle speed should increase with an increase in the running load. In practice, the lock-up vehicle reference speed is set at a low value on the assumption that the vehicle operates on a flat horizontal road surface. Therefore the lock-up state for a given gear ratio is effected at a relatively low vehicle speed, even with an increasing running load, thus failing to make full use of torque increase function of the torque converter. The result is that it is impossible to provide adequate acceleration to meet the requirement of a torque shortage or an unsmooth rotation of the engine results to cause vibration of the vehicle.

SUMMARY OF THE INVENTION

According to the present invention, there is provided a lock-up control system for an automatic transmission for an automotive vehicle having an engine. The transmission is shiftable into a plurality of gear ratios and includes a lock-up torque converter which is shiftable between a lock-up operating state and a torque converter operating state in a first predetermined shift pattern. The lock-up control system comprises a reference signal generator for producing a reference acceleration signal indicative of a reference acceleration which is suitable for a sensed vehicle speed and a sensed gear ratio and actual acceleration signal generator for producing an actual acceleration signal indicative of an actual acceleration of the automotive vehicle. Means are provided for comparing the actual acceleration signal with the reference acceleration signal, and means are provided for changing the first predetermined shift pattern into a second predetermined shift pattern in response to the result of the comparison by the comparing means and for causing the lock-up torque converter to effect shifting in the second predetermined shift pattern.

Accordingly, an object of the present invention is to provide a lock-up control system wherein a shift pattern in which a lock-up torque converter is shiftable into a lock-up operation state or a torque converter operation state is changed in response to a running load imposed on an automotive vehicle.

The reference acceleration signal is preferably generated by a reference acceleration signal generator which may comprise a load detector for receiving a plurality of signals indicative of operating conditions of the engine. These signals may be used as an address to determine the reference acceleration signal. The load detector may also receive a vehicle speed signal to determine the actual acceleration and generated the actual acceleration signal.

BRIEF DESCRIPTION OF THE DRAWINGS

The invention will be more apparent from the following description and drawings in which:

FIGS. 2A and 2B, when combined, provide a schematic view of a hydraulic control portion of the lock-up type automatic transmission;

DESCRIPTION OF THE PREFERRED EMBODIMENTS

Figure 1:
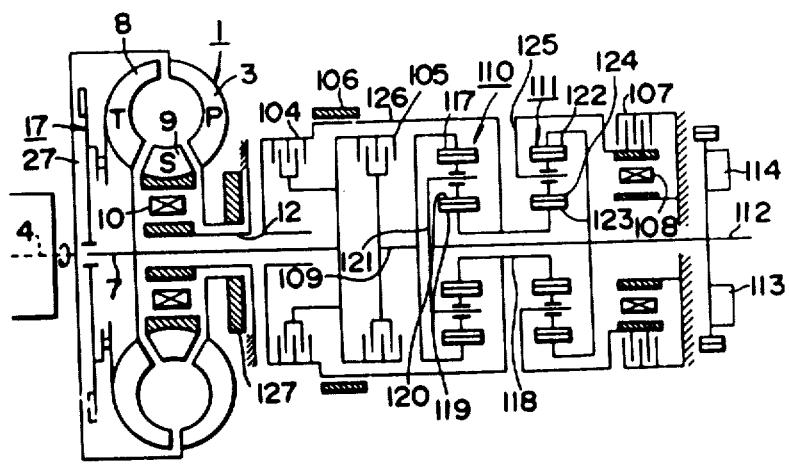
FIG. 1 is a schematic view of a planetary gearing portion of a lock-up type automatic transmission.

Referring to the drawings and particularly to FIG. 1, there is shown a crankshaft 4 driven by a prime mover, an engine, a torque converter 1 having a lock-up clutch 17 which will be described later, an input shaft 7, a front clutch 104 (a high-and-reverse clutch), a rear clutch 105 (a forward clutch), a second brake 106, a low reverse brake 107, a one-way brake 108, an intermediate shaft 109, a first planetary gear unit 110, a second planetary gear unit 111, an output shaft 112, a first governor valve 113, a second governor valve 114, and an oil pump 13

The torque converter 1 comprises a pump impeller 3, a turbine runner 8, and a stator 9, in which the pump impeller 3 is driven by the crankshaft 4 to circulate the torque converter operation oil therein so as to transmit torque to the turbine runner 8 fixed on the input shaft 7. The torque is further transmitted by the input shaft 7 to a change-speed planetary gearing. The stator 9 is disposed on a sleeve 12 through a one-way clutch 10, the one-way clutch allowing the stator 9 to rotate in the same direction as the crankshaft 4; that is, in the direction indicated by an arrow in FIG. 1 (this rotation is referred to as a forward rotation hereinafter), but not allowing it to rotate in the reverse direction (this rotation is referred to as a reverse rotation hereinafter). The first planetary gear unit 110 comprises an internally toothed gear 117 fixed on the intermediate shaft 109, a sun gear 119 fixed on a hollow transmitting shaft 118, and plural planetary pinions 120 capable of performing rotation and revolution simultaneously while meshing with the internally toothed gear 117 and sun gear 119 respectively, and a planetary pinion carrier 121 for supporting the planeytary pinions 120 fixed on an output shaft 112. The second planetary gear unit 111 comprises an internally toothed gear 122 fixed on the output shaft 112, a sun gear 123 fixed on the hollow transmitting shaft 118, and plural planetary pinions 124 capable of performing rotation and revolution while meshing with the internally toothed gear 122 and sun gear 123 respectively, and a planetary pinion carrier 125 for supporting the planetary pinions 124. The front clutch 104 is operative to connect the input shaft 7 to be driven by the turbine runner 8 to the hollow transmitting shaft 118 integrally rotatable with both of the sun gears 119 and 123 through a drum 126, whereas the rear clutch 105 is operative to connect the input shaft 7 to the internally toothed gear 117 of the first planetary gear unit 110 through the intermediate shaft 109. The second brake 106 is operative to anchor both sun gears 119 and 123 by braking the drum 126 fixed on the hollow transmitting shaft 118, whereas the low reverse brake 107 is operative to anchor the pinion carrier 125 of the second planetary gear unit 111. The one-way brake 108 allows forward rotation of the pinion carrier 125 but not reverse rotation thereof. The first and second governor valve assemblies 113 and 114 are operatively connected to the output shaft 112 and produce governor pressure in response to the vehicle speed.

Power flow paths, established when a manual speed selector rod is set in D position (forward drive range), will now be explained.

In this case, only the rear clutch 105, a forward clutch, is engaged. The power output of the engine via the torque converter 1 is transmitted by the input shaft 7 and rear clutch 105 to the internally toothed gear 117 of the first planetary gear unit 110. This rotation of the internally toothed gear 117 causes the planetary gears 120 to rotate forwardly. Accordingly, the sun gear 119 rotates reversely, and, since the sun gear 123 of the second planetary gear unit 111, which is rotatable with the sun gear 119 rotates reversely, the planetary gears 124 of the second planetary gear unit 111 rotates forwardly. The one-way brake 108 acts as a forward reaction brake to prevent the pinion carrier 125 from being rotated reversely by the sun gear 123, thus causing the forward rotation of the internally toothed gear 122 of the second planetary gear unit 111. Accordingly, the output shaft 112 which is rotatable with the internally toothed gear 122 rotates forwardly, thereby, establishing the first forward gear ratio.

If, in this state, the vehicle speed increases enough to cause the application of the second brake 106, the power flow path through the input shaft 7 and rear clutch 105 up to the internally toothed gear 117 is the same as that for the first forward speed. The second brake 106 acts as a forward reaction brake to anchor the drum 126 for preventing the rotation of the sun gear 119. This causes the planetary pinions 120 to rotate, revolving simultaneously, around the anchored sun gear 119. Accordingly, the planetary pinion carrier 121 and output shaft 112, which is rotatable with the pinion carrier 121, rotate at a faster speed than in the case of the first speed although with a certain reduction ratio, thereby establishing the second forward gear ratio.

If the vehicle speed further increases so as to cause the second brake 106 to be released and, in lieu thereof, the front clutch 104 to be engaged, the power on the input shaft 7 is transmitted partially through the rear clutch 105 to the internally toothed gear 117, while the remainder is transmitted through the front clutch 104 to the sun gear 119. Thus, the internally toothed gear 117 and sun gear 119 are interlocked and rotate forwardly, as a unit, together with both the pinion carrier 121 and output shaft 112 at the same rotational speed, thereby establishing the third forward gear ratio. In this case, the input is fed to both the front clutch 104 and rear clutch 105 and the torque increase is not carried out by the planetary gears so that none act as a reaction brake in this state.

The planetary gearing arrangement illustrated in and described in connection with FIG. 1 is similar in construction to the planetary gearing arrangemenet disclosed in U.S. Pat. No. 2,856,794 issued to H. W. Simpson, on Oct. 21, 1958, and reference thereto may be made for a more complete description of the construction and operation of the transmission.

Figure 2A:
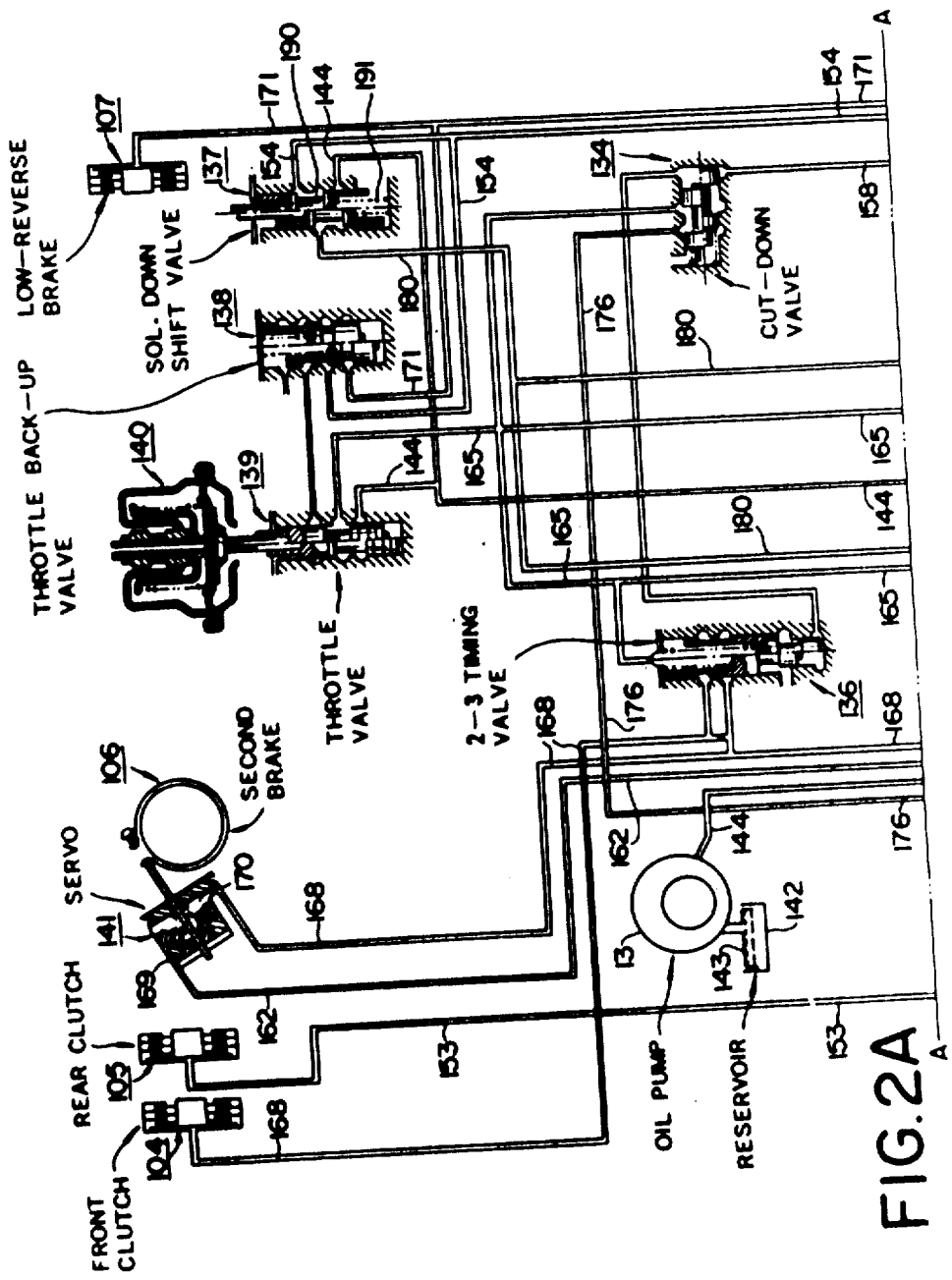

FIGS. 2A and 2B show a hydraulic control system of the above-described change speed transmission, which control system comprises an oil pump 13, a line pressure regulator valve 128, a pressure booster valve 129, a torque converter 1, a gear selector valve 130, a first governor valve 113, a second governor valve 114, a 1-2 shift valve 131, a 2-3 shift valve 132, a throttle pressure reducing valve 133, a cut-down valve 134, a second lock valve 135, a 2-3 timing valve 136, a solenoid down shift valve 137, a throttle back-up valve 138, a vacuum throttle valve 139, a vacuum diaphragm 140, a front clutch 104, a rear clutch 105, a second brake 106, a servo 141, a low-reverse brake 107, and oil pressure circuits. The oil pump 13 is driven by a prime mover through the driving shaft 14 and the pump impeller P of the torque converter 1 for drawing oil from a reservoir 142 through a strainer 143, where harmful dust is removed, during all operating conditions of the prime mover to send the oil to a line pressure circuit 144. The oil is regulated by the line pressure regulator valve 128 and the thus regulated oil is transmitted to the torque converter 1 and gear selector valve 130.

The hydraulic control system illustrated in FIGS. 2A and 2B is similar in construction to the hydraulic control system disclosed in U.S. Pat. No. 3,710, 652, issued to T. Miyazaki, on Jan. 16, 1973, and reference may be made for a more complete description of the construction and operation of the transmission.

The line pressure regulator valve 128 comprises a spool 172 and a spring 173, in which, in addition to the spring 173, the throttle pressure in a circuit 165 and the line pressure in a circuit 156 act on the spool 172 via a spool 174 of the pressure booster valve 129 against the line pressure from a circuit 144 through an orifice 175 and the pressure from a circuit 176 both acting on upper areas of the spool 172.

The torque converter operating oil pressure is introduced from the circuit 144 through the line pressure regulating valve 128 to a circuit 145 and, with a pressure maintaining valve 146, the level of this pressure is maintained within a certain range. When the pressure exceeds a certain level, the pressure maintaining valve 146 opens to permit the oil into a circuit 147 toward the rear lubricating part of the power transmitting mechanism. When the lubricating oil pressure is too high, a relief valve 148 opens, resulting in a pressure drop. On the other hand, the lubricating oil is supplied from the circuit 145 through a front lubrication valve 149, as it is open, to the front lubricating part of the power transmitting mechanism. The gear selector valve 130 is a manually operable liquid direction switching valve and it comprises a spool 150, and is connected to a gear selector rod (not shown) through a linkage so that manipulating the gear selector rod into any desired one of the positions causes the spool 150 to change the passage of the line pressure circuit 144. FIG. 2B shows a condition of the gear selector valve when the spool takes up the N (neutral) position, wherein the line pressure circuit 144 is permitted to communicate with two ports d and e.

The first and second governor valves 113 and 114 are in operative condition to produce a governor pressure while the automobile is moving forwardly. When the gear selector valve 130 assumes either D, II or I position, the oil pressure is fed from the line pressure circuit 144 to the second governor valve 114 through the port c of the gear selector valve 130. If under this condition the automobile begins to move, the governor pressure regulated by the second governor valve 114 is supplied to a circuit 157 leading to the first governor valve 113, and subsequently when the vehicle speed reaches a predetermined value, the spool 177 of the first governor valve 113 moves to a position wherein the circuit 157 communicates with a circuit 158, supplying the latter with the governor pressure regulated by the second governor valve 114. The governor pressure is also supplied to the circuit 158, thus acting on the respective end surfaces of the 1-2 shift valve 131, 2-3 shift valve and cut-down valve 134 against the respective springs which urge these valves toward respective lower half positions illustrated in FIGS. 2A and 2B.

In the oil flow passageway leading from the port c of the gear selector valve 130 through a circuit 153, a circuit 161 and a circuit 162, up to an apply side oil pressure chamber 169, the 1-2 shift valve 131 and second lock valve 35 are separately arranged, and a circuit 152 leads from the port b of the gear selector valve 130 to the second lock valve 135.

If the gear selector lever 130 is moved to the D position, the spool 150 of the gear selector valve 130 is moved to a position providing communication between the line pressure circuit 144 and ports a, b and c. From the port a, the oil pressure is transmitted through the circuit 151 to the second lock valve 135 to act on the lower end thereof for preventing the interruption of the circuits 161 and 162 which are permitted to communicate with each other when the spool 178 is pushed down, which spool is urged upwardly by a spring 179 and urged downwardly by the oil pressure transmitted thereto through the circuit 152 from the port b, while, the oil pressure at the port a is transmitted through an orifice 166 and a circuit 167 to the 2-3 shift valve 132. The oil pressure at the port c is transmitted through a circuit 153 to the second governor valve 114, rear clutch 105, and 1-2 shift valve 131, thereby the first forward gear ratio condition of the transmission being provided.

When, under this condition, the vehicle speed increases up to a certain level the governor pressure in the circuit 158 urges the spool 160 to the 1-2 shift valve 131, which is urged to the right by the spring 159, to move to the left, for effecting an upshift from the first forward gear ratio to the second forward gear ratio, and, as a result, the circuit 153 is permitted to communicate with the circuit 161 thereby allowing the oil pressure to be transmitted through the second lock valve 135 to the apply side oil pressure chamber 169 of the servo 141 through a circuit 162 to apply the second brake 106, thus establishing the second forward gear ratio condition.

When the vehicle speed further increases up to another certain level, the governor pressure in the circuit 158 urges the spool 164 off the 2-3 shift valve 132 to the left overcoming the spring 163, so that the circuit 167 is permitted to communicate with the circuit 168 directing the oil pressure, through the circuit 168, to the release-side oil pressure chamber 170 of the servo 141 so as to release the second brake 106 and also to the front clutch 104 to engage the clutch 104. Thus, the third forward gear ratio condition is established.

If the driver depresses the accelerator pedal down to a position causing the full opening of the throttle valve during operation with the gear selector lever in D position, an unillustrated kickdown switch is closed or rendered on to energize a downshift solenoid (not illustrated) for the solenoid downshift valve 137. This urges the spool 190 of the solenoid downshift valve 137 downwardly against a spring 191 from the locked position as illustrated by the right half in FIG. 2A. This movement of the spool 190 allows the kickdown circuit 180 to communicate with the line pressure circuit 144, thus allowing transmission of line pressure through the circuits 144 and 180 to the 1-2 shift valve 131 and the 2-3 shift valve 132 to act same in opposed relationship with the governor pressure. If, under this condition, the vehicle is operating in the third gear ratio, the spool 164 of the 2-3 shift valve is forced to move against the governor pressure toward the right hand position viewing in FIG. 2B by the above-mentioned line pressure, thus effecting a forced downshift from the thrid gear ratio to the second gear ratio when the vehicle speed falls in a predetermined range, thus providing a sufficient amount of acceleration force. If the above-mentioned kickdown is carried out during operation in the second gear ratio, since the governor pressure is relatively low, the spool 160 of the 1-2 shift valve 131 is forced to move rightwardly against the governor pressure from the left hand position. This causes a forced downshift from the second gear ratio to the first gear ratio, thus providing a sufficient amount of acceleration force to meet the relatively heavey load.

If the gear selector lever is moved to the II position, the spool 150 of the gear selector valve 130 is moved to a position providing communication between the line pressure circuit 144 and the ports b, c and d. The oil pressure at the port b is fed to the same place as in the case of D and the oil pressure at the port c is fed to the rear clutch to engage the latter. Because, under this condition, the oil pressure does not act on the lower end of the second lock valve 135 and because the lower land has a larger area than the upper land, which lands form a space on the spool 178 opening to the circuit 152, the spool 178 of the second lock valve 135 is pressed downwardly against the force of the spring 178 to assume a position in which the circuit 152 is permitted to communicate with the circuit 162, permitting the oil pressure to reach the apply side oil pressure chamber 169 of the servo 141 so as to effect application of the second brake 106, thereby establishing the second forward gear ratio condition. The oil pressure at the port d is transmitted through the circuit 154 to the solenoid down shift valve 137 and throttle back-up valve 138. Since the communication between the line pressure circuit 144 leading to the gear selector valve 130 and the port a thereof is prevented, the oil pressure does not get through the circuit 151 to the 2-3 shift valve 132. Thus neither release of the second brake 106 nor the application of the front clutch 104 will take place, so that an upshift to the third forward speed is prevented. As explained, the second lock valve 135 cooperates with the gear selector valve 130 to lock the transmission in the second forward gear. If the speed selector lever is moved to 1 position (the first forward speed fixed), the line pressure circuit 144 is permitted to communicate with the ports c, d and e. The oil pressure at the port c reaches the rear clutch 105 to effect clutch engagement and the oil pressure at the port d reach the same places as in the case of II. The oil pressure at the port e is transmitted through the circuit 155, 1-2 shift valve 131 and the circuit 171 to the low-reverse brake 107 so as to apply the low reverse brake 107 which, when applied, acts as a forward reaction brake, thereby rendering the transmission in the first forward gear ratio condition. The oil pressure at the port e is applied to the left end of the 1-2 shift valve assembly 131, through the circuit 171, urging the spool 160 to the right in cooperation with the spring 199, thereby locking the transmission in the first forward speed once a downshift is made thereto.

In FIG. 2B, the reference numeral 100 denotes a lock-up control system which comprises a lock-up control valve 30 and a lock-up solenoid 31.

Figure 3A:
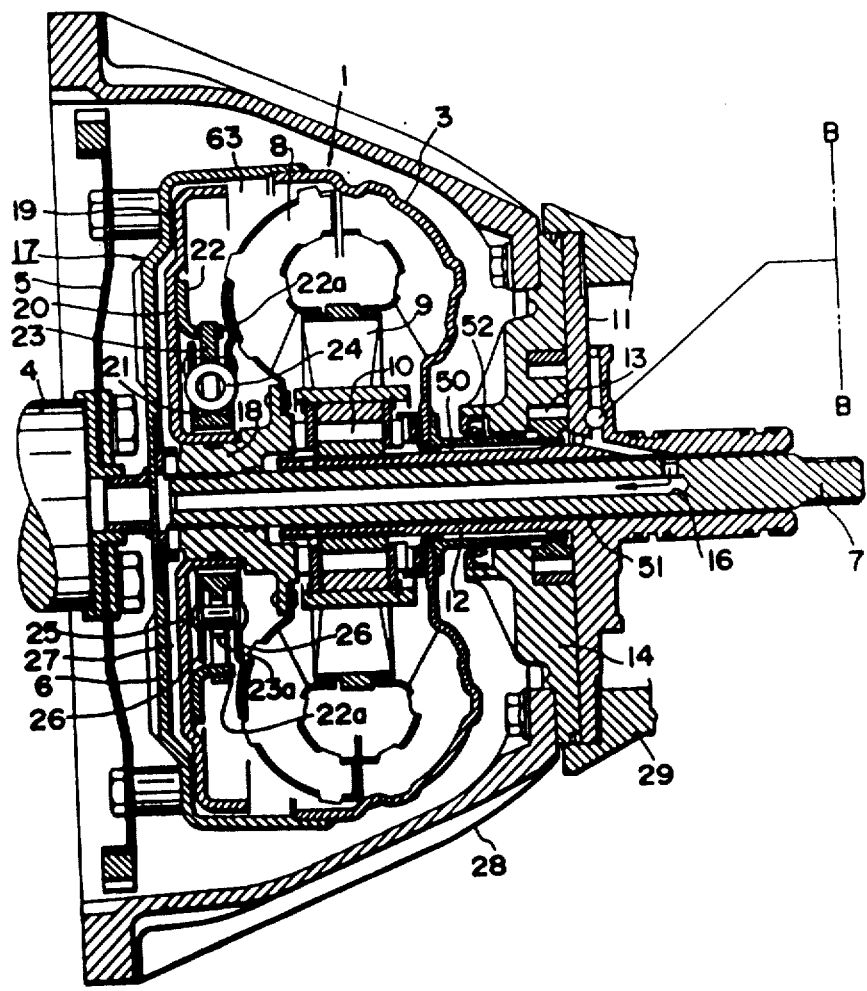
FIGS. 3A and 3B, when combined, provide a schematic sectional view showing the torque converter with a lock-up clutch, lock-up control valve and lock-up solenoid shown in FIG. 2B.
Figure 3B:
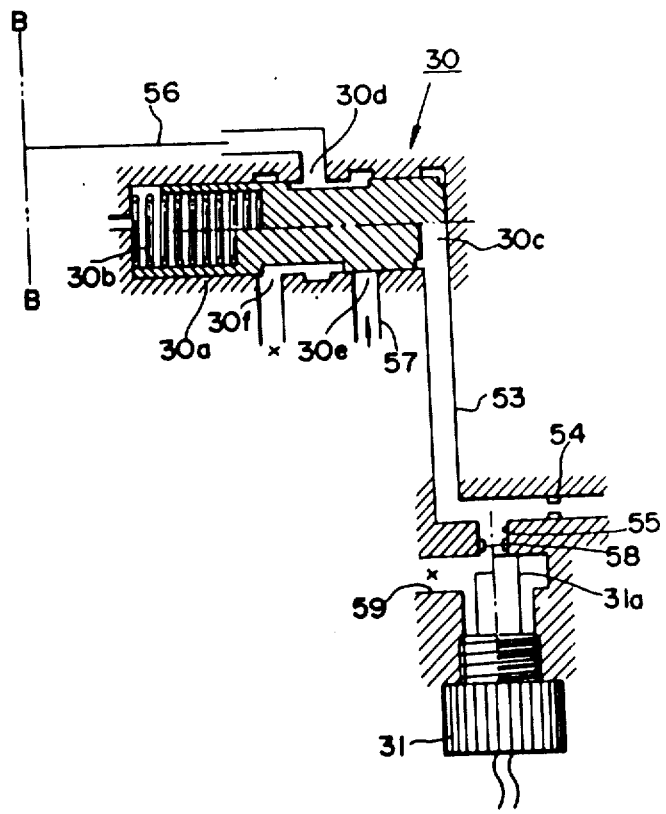

Referring to FIG. 3A and 3B, the lock-up control valve 30, lock-up solenoid 31 and the torque converter 1 with a lock-up clutch 17 are specifically explained hereinafter.

The pump impeller 3 of the torque converter 1 is connected via a torque converter cover 6 with a drive plate 5. The drive plate 5 is connected to the engine crankshaft 4. The turbine runner 8 is splined to the input shaft 7 with a hub 18, and further the stator 9 is connected to the sleeve 12 via the one-way clutch 10. The torque converter 1 is enclosed by a converter housing 28 which is connected together with a pump housing 14 and a pump cover 11 to a transmission case 29. The pump housing 14 and pump cover 11 cooperate to define a chamber within the oil pump 13 is accommodated. The pump 13 is connected to the pump impeller 3 through a hollow shaft 52 driven by the engine. The hollow shaft 52 jackets therein the sleeve 12 to define an annular oil feed passage 50, and the sleeve 12 allows the input shaft 7 to extend therethrough and cooperates to define therebetween an oil discharge passage 51. The sleeve 12 is formed integrally with the pump cover 11.

The lock-up clutch 17 has the following structure. A lock-up clutch piston 20 is fit around the hub 18 in an axially slidable manner, and this lock-up clutch piston is accommodated within the converter cover 6. The lock-up clutch piston 20 has an annular clutch facing 19 fixed to a surface thereof positioned opposite to the end wall of the torque converter cover 6, thereby to providing an arrangement wherein when clutch facing contacts the end wall of the converter cover 6, a lock-up clutch chamber 27 and a torque converter chamber 63 are defined on the opposite sides of the lock-up clutch piston 20.

The lock-up clutch piston 20 is drivingly connected to the turbine runner 8 via a torsional damper 21. The torsional damper 21 is of the same type as that used in a dry-type clutch and the like and comprises a drive plate 23, torsional springs 24, rivets 25 and driven plates 26. An annular member 22 is welded to the lock-up clutch piston 20 and has its claws 22a drivingly engaging in cutouts 23a formed through the drive plate 23. The driven plate 26 is attached to the turbine runner 8. The lock-up chamber 27 communicates with a lock-up passage 16 formed through the input shaft 7 the lock-up passage 16 is operatively associated with the lock-up control system 100.

The lock-up control valve 30 is provided with a spool 30a which when in the position illustrated in the upper half of FIG. 3B, permits a port 30d to communicate with a port 30e and, which when in the position illustrated in the lower half of FIG. 3B, permits the port 30d to communicate with a drain port 30f. The port 30d communicates through a passage 56 with the lock-up passage 16. The port 30e communicates through a branch passage 57 with a torque converter operating oil feed passage 50 as shown in FIG. 2B. A chamber 30c communicates through a passage 53 with the rear clutch pressure passage 153 as shown in FIG. 2B.

An orifice 54 is provided in the passage 53 at an intermediate portion. The passage 53 has a branch passage 55 extending from a location between this orifice 54 and the chamber 30c. The branch passage 55 has therein an orifice 58 and communicates with a drain port 59. The passage 55 is associated with the solenoid valve 31 which operates to open and close the branch passage 55. For this purpose, the lock-up solenoid 31 has a plunger 31a which normally takes the position illustrated in the left half portion in FIG. 2B or FIG. 3B, but which, when the lock-up solenoid 31 is energized, projects upwards to assume the position in the right half portion of FIG. 3B to close the branch passage 55.

When the lock-up solenoid 31 is not energized the branch passage 55 communicates with a drain port 59. Then, the rear clutch pressure in the passage 53 and directed toward the chamber 30c is discharged through the drain port 59, thus allowing the lock-up control valve 30 to communicate between the port 30d and 30e because the spool 30a is urged by a spring 30b to take the position illustrated in the upper half portion of FIG. 3B. Therefore, a torque converter interior pressure reaching the passage 57 is supplied through the ports 30e, 30d, passage 56, passage 16 to the lock-up chamber 27, thus causing the pressure within the lock-up chamber 27 to have the same pressure value as that within the converter chamber 63. This causes the lock-up clutch piston 20 to move rightwardly from the position illustrated in FIG. 3A to disengage its clutch facing 19 from the end wall of the converter cover 6, thus releasing the direct connection between the pump impeller 3 and the turbine runner 8 thereby, allowing the torque converter 1 to transmit the power in the torque converter state.

When the lock-up solenoid 31 is energized, the plunger 31a closes the branch passage 55, the rear clutch pressure is supplied through the passage 53 to the chamber 30c, thereby allowing the lock-up control valve 30 to communicate the port 30d with the drain port 30f because the spool 30a is moved leftwardly from the position illustrated in the upper half portion of FIG. 3B to the position illustrated in the lower half portion. This causes the lock-up chamber 27 to communicate through the lock-up passage 16, passage 56, port 30d to a drain port 30f, causing the pressure therein to go to zero. Then, the lock-up clutch piston 20 is moved leftwardly as viewed in FIG. 3A by means of the torque converter interior pressure into contact with the end wall of the torque converter cover 6, thus establishing a lock-up state wherein the pump impeller 3 is connected directly to the turbine runner 8.

Figure 4:
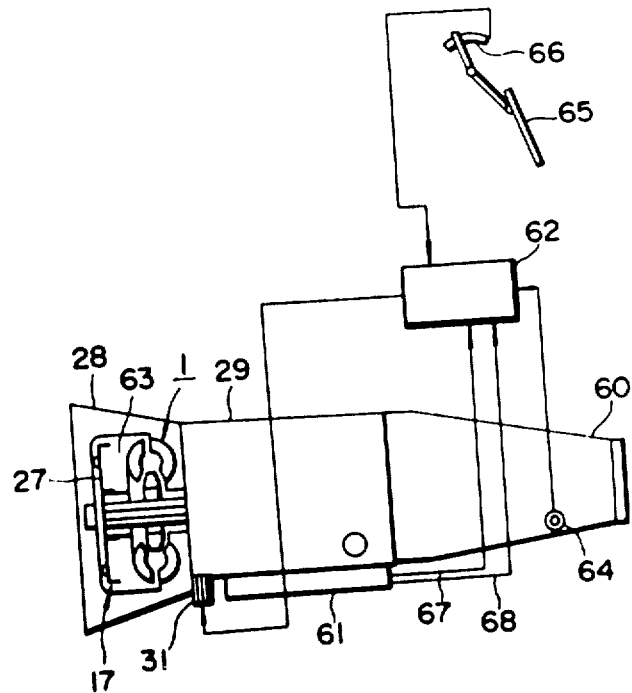
FIG. 4 is a diagrammatic overall view showing the lock-up type automatic transmission, lock-up control unit and a throttle sensor.

The lock-up control system 100 as constructed above effects a lock-up control which will be later described in connection with its lock-up solenoid 31 that is operated by an electronic lock-up control unit 62 as generally shown in FIG. 4.

Referring to FIG. 4, the torque converter housing 28 has accommodated therein the torque converter 1 as previously described, while, the power transmitting gear train is accommodated within the transmission case 29 and the rear extension 60. Attached to the lower part of the transmission case 29 is a valve body 61 wherein the gear ratio hydraulic control system or circuit as shown in FIGS. 2A and 2B is disposed.

The electronic lock-up control unit 62 for the lock-up solenoid 31 is fed with an electric signal, that indicates the vehicle speed, from a vehicle speed sensor 64, an electric signal from a throttle sensor 66 operatively connected with the depression of an accelerator pedal 68 which signal indicates a throttle opening degree, and a 1-2 shift signal through an electric path 67 and a 2-3 shift signal through an electric path 68.

Figure 5A:
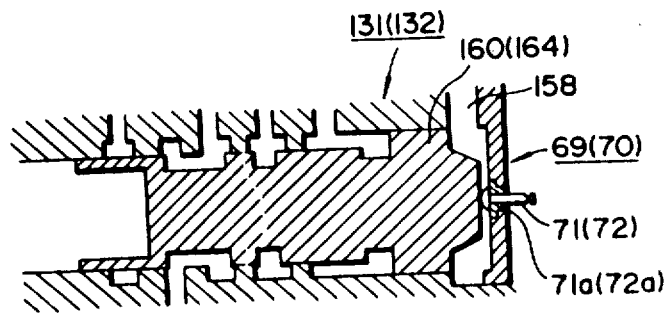
FIG. 5A is a cross sectional view showing a shift valve showing the constructional example of a shift switch.
Figure 5B:
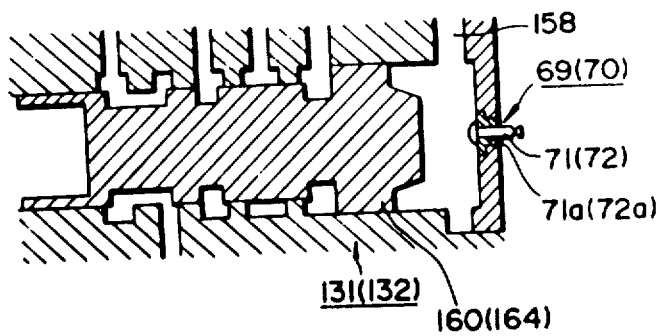
FIG. 5B is a similar view to FIG. 5A but showing a different condition.

The 1-2 shift signal and 2-3 shift signal which are fed through the electric paths 67 and 68 to the lock-up control unit 62 are produced by a 1-2 shift switch and a 2-3 shift switch which are respectively operated by the spool 160 of the 1-2 shift valve 131 and the spool 164 of the 2-3 shift valve 132 as shown in FIG. 2B. As shown in FIGS. 5A and 5B, the 1-2 shift switch 69 and 2-3 shift switch 70 are respectively mounted within the shift valves 131 and 132 in such a manner as to be closed or opened in response to the positions of the corresponding spools 160 and 164. For this purpose, the spools 160 and 164 are used as movable contacts and stationary contacts 71 and 72 are mounted through insulators 71a and 72a are disposed at position opposite to right end surfaces, as illustrated, of the respective spools, thus allowing the spool 160 and the stationary contact 71 to cooperate with each other to form the 1-2 shift switch 69 and the spool 164 and stationary contact 72 to cooperate with each other to form the 2-3 shift switch 70.

Figure 6:
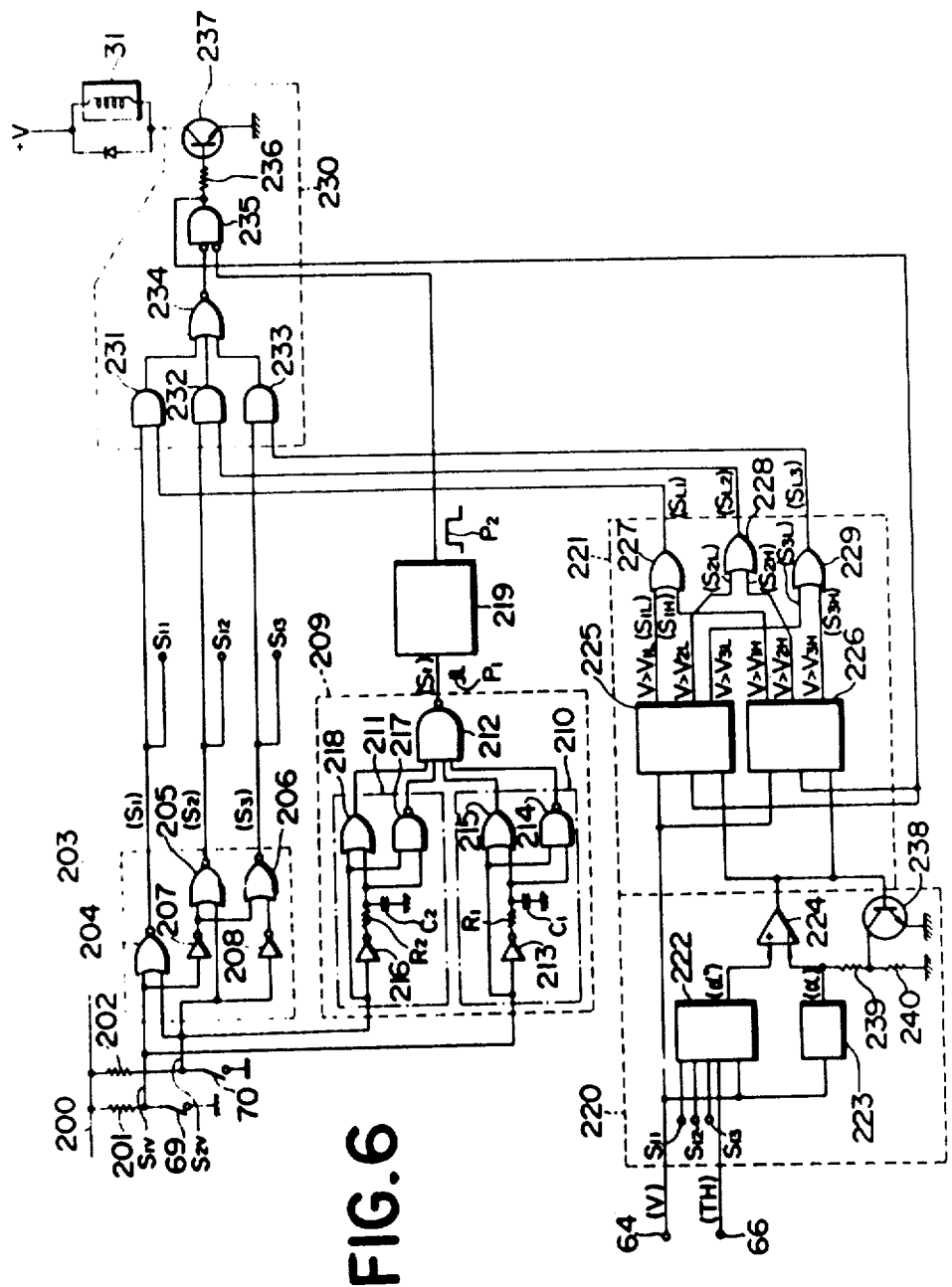
FIG. 6 is a block diagram of the lock-up control system according to the present invention.

The lock-up control unit 62 is designed to effect on-off control of the lock-up solenoid 31 in a scheduled pattern in accordance with a result of arithmetric operation therein based upon the above-mentioned signals fed thereto, and for this purpose, the lock-up control unit 62 comprises a logic circuit as shown in FIG. 6 and performs the following functions.

During operation of the vehicle with the automatic transmission in the D range, the spool 160 of the 1-2 shift valve 131 and the spool 164 of the 2-3 shift valve 132 assume positions as illustrated in FIG. 5A (for the reason mentioned as above when the first gear ratio is selected) contacting the stationary contacts 71 and 72 respectively thus closing the shift switches 69 and 70. The closing of the shift switches 69 and 70 allows the power supply 200 to be grounded through the resistors 201 and 202, thus rendering shift valve signals $S_1$, and $S_2$, to take L levels, respectively. When the second gear ratio is selected, the spool 160 of the 1-2 shift valve 131 assumes the position as illustrated in FIG. 5B after moving away to disengage from the stationary contact 71 to render the 1-2 shift switch 69 open, while, the 2-3 shift switch 70 remains in its closed state because the 2-3 shift valve 132 remains in the state as illustrated in FIG. 5A. This causes the shift switch 69 to change the shift valve signal $S_1$, to a H level and the shift switch 70 to maintain the shift valve signal $S_2$, at a L level. When the third gear ratio is selected, both of the spool 160 of the 1-2 shift valve 131 and the spool 164 of the 2-3 shift valve 132 take the position as illustrated in FIG. 5B after moving away to disengage from the stationary contacts 71 and 72 respectively rendering both of the shift switches 69 and 70 open. This causes the shift switches 69 and 70 to change the shift valve signals $S_1$, and $S_2$, to H levels, respectively.

Referring to FIG. 6, there is depicted a gear ratio decision circuit 203 to which the above-mentioned shift valve signals $S_1$, and $S_2$, are fed. The gear ratio decision circuit 203 is in the form of a logic circuit comprising NOR gates 204, 205 and 206 and NOT gates 207 and 208. Upon selection of the first gear ratio when the shift valve signals $S_1$, and $S_2$, take L levels, only the output $S_1$ (1st gear ratio signal) of the NOR gate 204 takes a H level; upon selection of the second gear ratio when only the shift valve signal $S_1$, takes a H level, only the output $S_2$ (2 nd gear ratio signal) of the NOR gate 205 takes a H level; and upon selection of third gear ratio when both the shift valve signals $S_1$, and $S_2$, take a H level, only an output $S_3$ (3rd gear ratio signal) takes a H level.

It will be understood that the gear ratio decision circuit 203 generates a plurality of gear ratio signals $S_1$, $S_2$, $S_3$ that indicate a corresponding gear ratios, viz., first gear ratio, second gear ratio and third gear ratio, selectable by the lock-up type automatic transmission.

The shift valve signals $S_1$, and $S_2$, are fed also to a gear shifting decision circuit 209. The gear shifting decision circuit comprises an edge trigger circuit 210 to detect a rise and a fall in the shift valve signal $S_1$, and an edge trigger circuit 211 to detect a rise and a fall in the shift valve signal $S_2$, and a NAND gate 212. The edge trigger circuit 210 comprises a NOT gate 213, a resistor $R_1$ and a condensor $C_1$ which form a delay circuit, a NAND gate 214 for a rise detection, and an OR gate 215 for a fall detection. Similarly, the edge trigger circuit 211 comprises a NOT gate 216, a delay circuit having a resistor $R_2$ and a condensor $C_2$, a NAND gate 217, and an OR gate 218. When the corresponding shift valve signals $S_1$, and $S_2$, change from a L level to a H level or from a H level to a L level, viz., upon occurrence of gear shifting, the edge trigger circuits 210 and 211 feed a negative polarity pulse signal (the duration of the pulse width is determined by the above-mentioned delay circuit) to the corresponding input terminal of a NAND gate 212. Then, the NAND gate 212 produce a positive polarity trigger pulse (designated by $P_1$) which is obtained after inverting the polarity of the pulse signal fed thereto. The pulse $P_1$ is fed to a timer 219 as a gear shifting signal $S_f$. The timer 219 is operable to adjust the pulse width of the gear shifting signal $S_f$ so that it can be adjustably varied to produce a variable pulse with signal $P_2$.

Designated by 220 is a load detector circuit and designated by 221 is a vehicle speed comparator circuit. The vehicle speed signal V from the vehicle speed sensor 64 is fed to the load detector circuit 220 and the vehicle speed comparator circuit 221. throttle signal TH from the throttle sensor 66 is also fed to the load detector circuit 220. The load detector circuit 220 comprises a reference acceleration memory and generating circuit 222, an actual acceleration generating circuit in the form of a differential circuit 223 and a comparator 224. The reference acceleration memory and generating circuit 222 has input terminals $S_{11}$, $S_{12}$ and $S_{13}$ connected to the corresponding output terminals of the gear ratio decision circuit 203 (the corresponding ones are designated by the same reference numerals), and are fed with gear ratio signals $S_1$, $S_2$ and $S_3$ through these terminals, as well as the vehicle speed signal V and the throttle signal TH, and use these operating condition indicative signals as addresses to determine a reference acceleration. It then generates a reference acceleration signal $a'$ that indicates the reference acceleration. The reference acceleration is a function of the vehicle speed, the throttle opening degree and the gear ratio. Various reference acceleration values are stored in the memory and generating circuit 222 for different combinations of vehicle speed, throttle opening degree and gear ratio. Each of the reference acceleration values correspond to an acceleration of the automotive vehicle that is obtained when the automotive vehicle runs on a horizontal flat road surface at a given vehicle speed, with a given throttle opening and in a given gear ratio.

The differential circuit 223 differentiates the vehicle speed signal V with respect to time for determining an actual acceleration and generating an actual acceleration signal (voltage) $a$ that indicates the actual acceleration. The comparator 224 compares the actual acceleration signal $a$ with the reference acceleration signal $a'$ and generates a L level signal (first command signal) when the actual acceleration signal $a$ is greater than the reference acceleration signal $a'$, viz., when the desired degree of acceleration is obtained, while, it generates a H level signal (second command signal) when the actual acceleration signal $a$ is smaller than the reference acceleration signal $a'$. Thus, the load detector circuit 220 can determine whether the running load is relatively large or relatively small. In other words, the comparator 224 produces an H level signal (second command signal) when the running load is great and to produce a L level signal (first command signal) when the running load is relatively small.

Preferrably, a hysteresis setting circuit is provided in association with the comparator 224 which comprises a transistor 238 and resistors 239 and 240. The transistor 238 has its base connected to an output terminal of the comparator 224, and the actual acceleration input terminal (a) of the comparator 224 is grounded through series connected resistors 239 and 240 wherein a junction between the resistors 239 and 240 is grounded through a collector-emitter path of the transistor 238. In the hysteresis setting circuit, when the output signal of the comparator 224 takes a L level, the transistor 238 is rendered non-conductive and the actual acceleration signal determined by the total of the resistors 239 and 240 is fed to the comparator 224 to allow the comparator 224 to compare the actual acceleration signal $a$ with the reference acceleration signal $a'$. Once the comparator 224 produces a H level signal as a result of a comparison operation therein, the transistor 238 is rendered conductive, thus essentially shorting out the resistor 240, resulting in a reduction in the magnitude of the actual acceleration signal fed to the comparator 224 to $a$-$\Delta a$, so that the comparator 224 compares this reduced magnitude signal with a reference acceleration signal $a'$. Accordingly, whenever the output level of the comparator 224 changes from a L level to a H level, the actual acceleration signal $a$ is reduced by a predetermined value, $\Delta a$ so that the comparator 224 changes its output level with a hysteresis $\Delta a$.

In other words, the hysteresis setting circuit reduces the actual acceleration signal upon appearance of the second command signal.

The vehicle speed comparator circuit 221 comprises a low vehicle speed comparator circuit 225, a high vehicle speed comparator circuit 226, and OR gates 227 to 229. The low vehicle speed comparator circuit 225 is actuated or rendered operative upon appearance of a L level signal from the comparator 224, viz., first command signal, and the high vehicle speed comparator circuit 224 is actuated or rendered operative upon appearance of a H level signal from the comparator 204, viz., second command signal. When the output of the comparator 224 takes a L level because of a small running load, the low vehicle speed comparator circuit 225 is rendered operative, while, when the output of the comparator 224 takes a H level because of a large running load, the high vehicle speed comparator circuit 226 is rendered operative. Upon being rendered operative, the low vehicle speed comparator circuit 225 compares the vehicle speed signal V fed thereto from the vehicle speed sensor 64 with a set of reference vehicle speeds $V_{1L}$, $V_{2L}$ and $V_{3L}$ that correspond to the gear ratios, respectively, and generating a plurality of patterns of signals that indicate a corresponding plurality of lock-up ranges. Upon being rendered operative, the high vehicle speed comparator circuit 226 compares the vehicle speed signal V with a set of reference vehicle speeds $V_{1H}$, $V_{2H}$ and $V_{3H}$ that correspond to the gear ratios, respectively, and generates a plurality of of signals that patterns indicate a corresponding plurality of lock-up ranges that are different from the lock-up ranges provided by the low vehicle speed comparator circuit 225. The reference vehicle speeds $V_{1L}$ and $V_{1H}$ correspond to a lock-up vehicle speed during operation in the first gear ratio under low running load operating conditions and under high running load operating conditions, respectively. $V_{2L}$ and $V_{2H}$ correspond to a lock-up vehicle speed during operation in second gear ratio under low running load operating conditions and under high running load operating conditions, respectively. $V_{3L}$ and $V_{3H}$ correspond to a lock-up vehicle speed during operation in third gear ratio under low running load operating conditions and under high running load operating conditions, respectively. For example, $V_{1L}=15$ km/h, $V_{2L}=25$ km/h, $V_{3L}=30$ km/h, $V_{1H}=30$ km/h, $V_{2H}=39$ km/h, and $V_{3H}=45$ km/h. The low vehicle speed comparator circuit 225 changes the level of a lock-up permission signal $S_{1L}$ to a H level when the vehicle speed signal V exceeds $V_{1L}$, also changes a level of a lock-up permission signal $S_{2L}$ to a H level when the vehicle speed signal V exceeds $V_{2L}$, and further when the vehicle speed signal V exceeds $V_{3L}$, changes a level of a lock-up permission signal $S_{3L}$ to a H level. Similarly, the high vehicle speed comparator circuit 226 changes a level of a lock-up permission signal $S_{1H}$ to a H level when the vehicle speed signal V exceeds $V_{1H}$, and changes the level of a lock-up permission signal $S_{2H}$ to a H level when the vehicle speed signal V exceeds $V_{2H}$, and further when the vehicle speed signal V exceeds $V_{3H}$, changes the level of the lock-up permission signal $S_{3H}$ to a H level. Since the lock-up permission signals $S_{1L}$ and $S_{1H}$ are fed to an OR gate 227, the OR gate 227 produces a lock-up signal $S_{L1}$ for first gear ratio operation having a H level when one of the lock-up permission signals $S_{1L}$ or $S_{1H}$ takes a H level, that is, when the vehicle speed V exceeds lock-up vehicle speed $V_{1L}$ or $V_{1H}$. Since the lock-up permission signals $S_{2L}$ and $S_{2H}$ are fed to an OR gate 228, the OR gate 228 produces a lock-up signal $S_{L2}$ for second gear ratio operation having a H level when either one of the signals $S_{2L}$ or $S_{2H}$ takes a H level, that is, when the vehicle speed V exceeds either the lock-up vehicle speed $V_{2L}$ or $V_{2H}$. Furthermore, since the lock-up permission signals $S_{3L}$ and $S_{3H}$ are fed to an OR gate 229, the OR gate 229 produces a lock-up signal for a third gear ratio operation having a H level when either one of the signals $S_{3L}$ or $S_{3H}$ takes a H level, that is, when the vehicle speed V exceeds the lock-up vehicle speeds $V_{3L}$ or $V_{3H}$.

The lock-up signals $S_{L1}$, $S_{L2}$ and $S_{L3}$, therefore, show a plurality of patterns as shown in the following Table that indicate lock-up ranges corresponding to the gear ratios, respectively.

|  | $S_{L1}$ | $S_{L2}$ | $S_{L3}$ |
|---|---|---|---|
| 1st | H | L | L |
| 2nd | H | H | L |
| 3rd | H | H | H |

Designated by 230 is an actuating circuit for the lock-up solenoid 31 which circuit comprises three AND gates 231 to 233, a NOR gate 234, a NAND gate 235, a bias resistor 236 and a Darlington transistor 237. The AND gates 231 to 237 each have one input terminal fed with a corresponding one of said gear ratio signals $S_1$ to $S_3$ and the other input terminal thereof fed with the corresponding one of said lock-up signals $S_{L1}$, $S_{L2}$ and $S_{L3}$. The AND gate 231 produces a H level signal when the gear ratio signal $S_1$ takes a H level as the gear ratio is the first gear ratio and when the lock-up signal $S_{L1}$ takes a H level as the vehicle speed is higher than the lock-up vehicle speed $V_{1L}$ (during low running load operation) or the lock-up vehicle speed $V_{1H}$ (during high running load operation), that is, during operation with low running load as illustrated by a range A in FIG. 8A or during operation with high running load illustrated by a range A' in FIG. 8B. The AND gate 232 produces a H level signal upon appearance of a gear ratio signal $S_2$ and a lock-up signal $S_{L2}$, that is, during operation with low running load as illustrated by a range B in FIG. 8A or during operation with high running load as illustrated by a range B' in FIG. 8B. Furthermore, in a similar manner, the AND gate 233 produces a H level signal from a gear ratio signal $S_3$ and a lock-up signal $S_{L3}$, that is, during operation with low running load as illustrated by a range C in FIG. 8A or during operation with high running load as illustrated by a range C' in FIG. 8B. Upon appearance of a H level signal from any one of the AND gates 231 to 233, the signal causes a NOR gate to produce a L level signal. This L level signal is fed to one of input terminals of a NAND gate 235 as an actuating signal, and this NAND gate applies a H level signal, when a pulse signal $P_2$ is not fed to the other input terminal, that is, viz., when the gear shifting is not being carried out, to the base of the transistor 237 through a resistor 236, thus rendering this transistor conductive to actuate the lock-up solenoid 31 with the power supply +V.

Figure 8A:
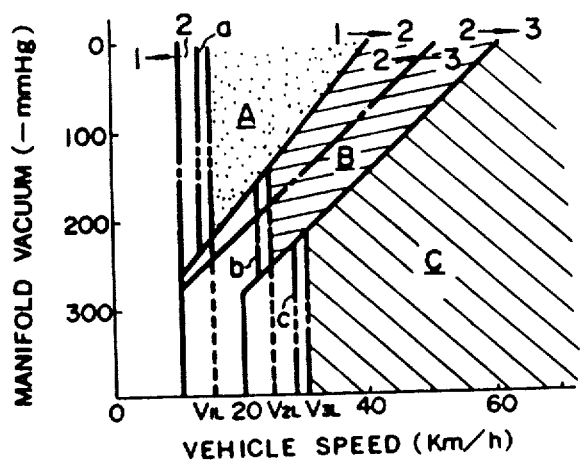
FIGS. 8A and 8B are shift pattern diagrams showing lock-up ranges.
Figure 8B:
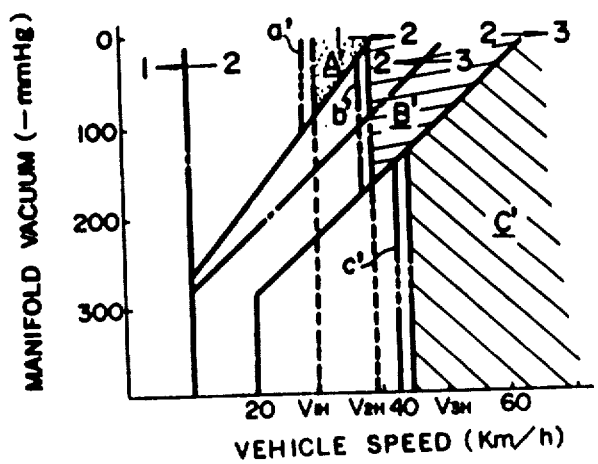

Accordingly, during operation with low running load within lock-up range A, range B or range C as illustrated in FIG. 8A or during operation with high running load within range A', range B' or range C' as illustrated in FIG. 8B and when the gear shifting is not being carried out, the lock-up solenoid 31 is energized to effect a lock-up as hereinafter described. However, when gear shifting is being carried out and thus a gear shifting signal $S_t$ (pulse signal $P_1$) is produced, the pulse signal $P_2$ produced by the timer 219 during the gear shifting operation (for the duration of time corresponding to the pulse width of the pulse signal $P_2$) applies an H level signal to the NAND gate 235, so that the lock-up solenoid 31 is deenergized even during operation within any one of the lock-up ranges, thus preventing the occurrence of a gear shift shock.

Next, the lock-up operation upon energization of the lock-up solenoid 31 will be explained. Upon energization, the plunger 31a of the solenoid 31 takes a projected position as indicated by the right half of the plunger in FIG. 3B, thus closing the branch passage 55 and causing the torque converter 1 to assume lock-up state. In other words, in the projected position, the plunger 31a closes the branch passage 55, allowing the rear clutch pressure to be fed through the passage 53 to the chamber 30c to cause the spool 30a of the lock-up control valve 30 to move to the position illustrated in the upper half from the position illustrated in lower half of in FIG. 3B. This in turn connects the port 30d to the drain port 30f. This causes the lock-up chamber 27 to connect through the lock-up passage 16, passage 56 and port 30d to the drain port 30f, thus establishing a zero pressure state therein. As a result, the lock-up clutch piston 20 is urged to the left as viewed in FIG. 3B in response to a torque converter interior pressure to bring the clutch facing 16 into pressing engagement with the end wall of the torque converter cover 6 to effect a lock-up state wherein the pump impeller 3 and turbine runner 8 are directly connected.

During operation outside of the lock-up ranges A, B, and C or outside of the lock-up ranges A', B' and C', H level signals are not fed simultaneously to both two inputs of each of the AND gates 231 to 233 and thus three inputs to the NOR gate 234 all take L levels, so that the NOR gate continues to produce an H level, thus preventing the NAND gate from producing an H level. Thus, the lock-up solenoid 31 remains disengaged. The lock-up solenoid 31 is deenergized for a duration of gear shifting even upon operation within said lock-up ranges as described above. In the case that the lock-up solenoid 31 is deenergized, the plunger 31a is in the left half position illustrated in FIG. 3B, opening the branch passage 55 to allow communication with the drain port 59. This causes the rear clutch pressure directed toward the chamber 30c through the passage 53 to drain through the drain port 59, thus allowing the spool 30a of the lock-up control valve 30 to take an illustrated upper half position under the influence of the spring 30b to allow the port 30d to communicate with the port 30e.

Thus, the torque converter interior pressure fed to the passage 57 is fed through the ports 30c and 30d, and passages 56 and 16 to the lock-up chamber 27, rendering the pressure within the lock-up chamber 27 to become substantially equal to the pressure within the converter chamber 63. This causes the lock-up clutch piston 20 to move rightwardly from the illustrated position in FIG. 3A, allowing the clutch facing 19 to disengage from the end wall of the converter cover 6, releasing the direct connection between the pump impeller 3 and turbine runner 8 to allow the torque converter 1 to transmit power in its converter state.

Since, according the present invention, reference vehicle speeds or lock-up vehicle speeds are altered to optimum values in response to a running load, the lock-up takes place early, viz., at relatively low vehicle speed, with respect to the vehicle speed during operation under a low running load, thus contributing to fuel economy, while, the lock-up takes place late, viz., at relatively high vehicle speed, with respect to the vehicle speed, thus making full use of torque increasing function of the torque converter 1 to meet a desired degree of acceleration, thus satisfactorily meeting the two conflicting requirements.

It will be understood that the provision of the hysteresis setting circuit (238, 239, 240) reduces the actual acceleration signal α upon apperance of a H level signal from the comparator 224, viz., a second command signal which appears when the actual acceleration signal α is smaller than the reference acceleration signal α'.

It follows that the H level signal is generated until the actual acceleration becomes greater than the actual acceleration which previously caused the comparator 224 to generate the H level signal. Therefore, frequent changes in output signal level of the comparator 224 are prevented during operation with loads in proximity to the range of lock-up vehicle speed which could result in the occurrence of chatterring of the lock-up solenoid 31. Thus unnecessary shifting between the lock-up state and the torque converter state which would impair riding comfort is prevented.

Figure 7:
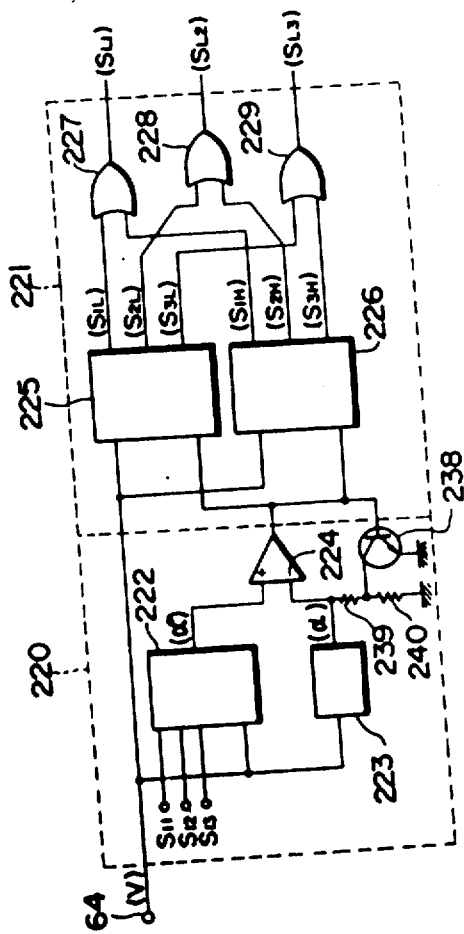
FIG. 7 is a fragmentary view of FIG. 6 showing a simplified construction of the load detector means.

Although, in the above described embodiment shown in FIG. 6, the reference acceleration memory and generating circuit 222 of the load detector circuit 220 is designed to determine an appropriate reference acceleration α' as against gear ratio signals $S_1$, $S_2$, $S_3$, vehicle speed signal V, and throttle signal TH by calculation or table look-up, the reference acceleration memeory and generating circuit may be designed as shown in FIG. 7 wherein the reference acceleration is determined excluding the throttle signal TH. In this case, the precision of the reference acceleration α' is relatively rough, but, it has an advantage that the circuit structure of the load detector circuit 220 becomes simplified.

Chattering of the lock-up solenoid 31 during operation in the proximity of lock-up vehicle speeds may be prevented by setting the lock-up release vehicle speeds lower than the lock-up vehicle speeds, as shown by a to c or by a' to c' shown in FIGS. 8A and 8B to provide a hysteresis between upshifting into the lock-up state and downshifting from the lock-up state. For this purpose, a lock-up signal which causes energization of the lock-up solenoid 31, for example, on the occurrence of a H level signal from the NAND gate 235, is fed back to the low vehicle speed comparator circuit 225 and high vehicle speed comparator circuit 226 as shown in FIG. 6, and the circuits 225 and 226 are designed so as to compare the vehicle speed signal with a set of relatively low vehicle speeds as compared to the reference vehicle speeds upon appearance of the lock-up signal.

What is claimed is:

1. A lock-up control system for an automatic transmission for a vehicle, the automatic transmission being shiftable between a plurality of gear ratios and having a lock-up torque converter shiftable between a lock-up operation state and a torque converter operation state in a first predetermined shift pattern, the lock-up control system comprising:
   vehicle speed signal generating means for producing a vehicle speed signal indicative of a vehicle speed;
   gear ratio signal generating means for determining which of the plurality of gear ratios is selected in the automatic transmission and for producing a gear ratio signal indicative of the selected gear ratio;
   reference acceleration signal generating means responsive to said vehicle speed signal and said gear ratio signal for producing a reference acceleration signal indicative of a reference acceleration;
   actual acceleration signal generating means responsive to said vehicle speed signal for producing an actual acceleration signal indicative of an actual acceleration of the vehicle;
   comparing means for comparing said actual acceleration signal with said reference acceleration signal and generating a command signal; and
   means for changing from the first predetermined shift pattern to a second predetermined shift pattern in response to said command signal and for causing the lock-up torque converter to effect shifting in said second predetermined shift pattern.

2. A lock-up control system as claimed in claim 1, wherein said reference acceleration corresponds to an acceleration obtained when the vehicle operates on a horizontal flat road for the vehicle speed indicated by said vehicle speed signal and for the gear ratio indicated by said gear ratio signal.

3. A lock-up control system as claimed in claim 2, wherein:
   said comparing means generates a first command signal when said actual acceleration signal has a first predetermined relationship with said reference acceleration signal, and a second command signal when said actual acceleration signal has a second predetermined relationship with said reference acceleration signal; and
   said changing means comprises a first comparator for comparing said vehicle speed signal with a first plurality of predetermined reference values which respectively correspond to said plurality of gear ratios, when said first command signal is present, and a second comparator for comparing said vehicle speed signal with a second plurality of predetermined reference values which respectively correspond to said plurality of gear ratios when said second command signal is present, and a logic gate coupled to said first and second comparators for producing a lock-up signal in response to a comparison by said first comparator or by said second comparator, and means responsive to said lock-up signal for locking said lock-up torque converter.

4. A lock-up torque converter as claimed in claim 3, further comprising hysteresis setting means responsive to said second command signal for decreasing said actual acceleration signal.

5. A lock-up control system for an automatic transmission for a vehicle having an engine and a throttle, the automatic transmission being shiftable between a plurality of gear ratios and having a lock-up torque converter shiftable between a lock-up operation state and a torque converter operation state in a first predetermined shift pattern, the lock-up control system comprising:

vehicle speed signal generating means for producing a vehicle speed signal indicative of a vehicle speed;

throttle opening signal generating means for producing a throttle opening signal indicative of a degree of opening of said throttle;

gear ratio signal generating means for determining which of the plurality of gear ratios is selected and producing a gear ratio signal indicative of the selected gear ratio;

reference acceleration signal generating means responsive to said vehicle speed signal, said throttle opening signal, and said gear ratio signal, for producing a reference acceleration signal indicative of a reference acceleration;

actual acceleration signal generating means responsive to said vehicle speed signal for producing an actual acceleration indicative signal indicative of an actual acceleration of the vehicle;

comparing means for comparing said actual acceleration signal with said reference acceleration signal and generating a command signal; and means for changing from said first predetermined shift pattern into a second predetermined shift pattern in response to said command signal and for causing the lock-up torque converter to effect shifting in said second predetermined shift pattern.

6. A lock-up control system as claimed in claim 5, wherein said reference acceleration corresponds to an acceleration obtained when the vehicle operates on a horizontal flat road for the vehicle speed indicated by said vehicle speed signal; and for the throttle opening degree indicated by said throttle opening signal and for the gear ratio indicated by said gear ratio signal.

7. A lock-up control system as claimed in claim 6, wherein said comparing means generates a first command signal when said actual acceleration signal has a first predetermined relationship with said reference acceleration signal and a second command signal when said actual acceleration signal has a second predetermined relationship with said reference acceleration signal, and said changing means comprises a first comparator for comparing said vehicle speed signal with a first plurality of predetermined reference values which respectively correspond to said plurality of gear ratios when said first command signal is present, a second comparator for comparing said vehicle speed signal with a second predetermined plurality of reference values which respectively correspond to said plurality of gear ratios when said second command signal is present, a logic gate coupled to said first and second comparators for producing a lock-up signal in response to a comparison by said first comparator or by said second comparator, and means responsive to said lock-up signal for locking said lock-up torque converter.

8. A lock-up control system as claimed in claim 7, further comprising hysteresis setting means responsive to said second command signal for decreasing said actual acceleration signal.

9. A lock-up control system for an automatic transmission for a vehicle, the automatic transmission being shiftable between a plurality of gear ratios and having a lock-up torque converter shiftable between a lock-up operation state and a torque converter operation state in a first predetermined shift pattern, the lock-up control system comprising:

vehicle speed signal generating means for producing a vehicle speed signal indicative of a vehicle speed;

actual acceleration signal generating means responsive to said vehicle speed signal for producing an actual acceleration of the vehicle;

means for generating a reference acceleration signal;

comparing means for comparing said actual acceleration signal with said reference acceleration signal and generating a command signal; and means for changing from said first predetermined shift pattern into a second predetermined shift pattern in response to said command signal and for causing the lock-up torque converter to effect shifting in said second predetermined shift pattern.

* * * * *